UNITED STATES PATENT OFFICE.

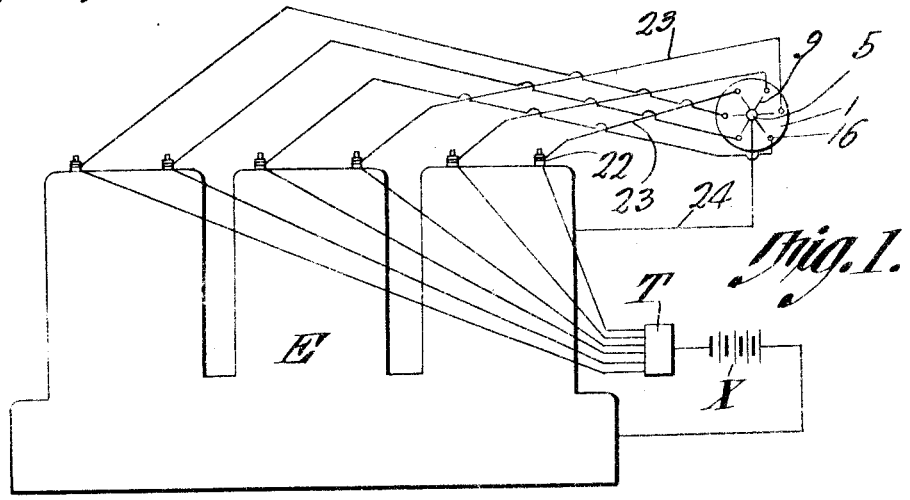
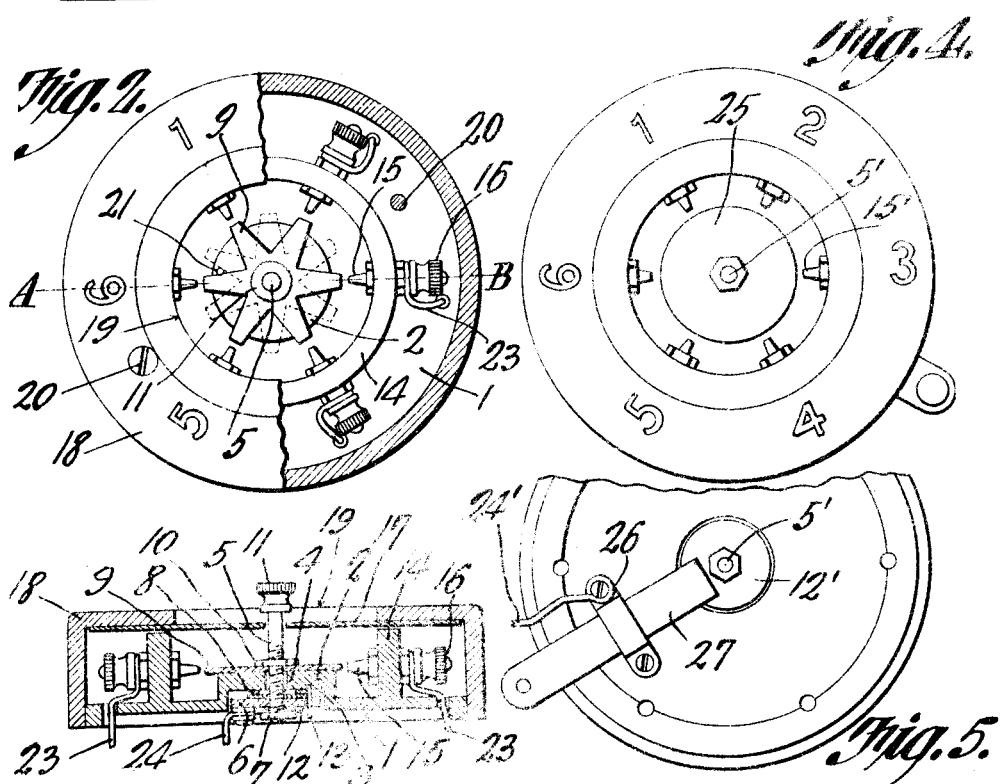

GEORGE M. BEARD, OF PLEASANT LAKE, INDIANA.

TROUBLE-DETECTOR FOR SPARK-PLUGS.

1,138,441. Specification of Letters Patent. Patented May 4, 1915.

Application filed April 3, 1914. Serial No. 829,357.

*To all whom it may concern:*

Be it known that I, GEORGE M. BEARD, a citizen of the United States, residing at Pleasant Lake, in the county of Steuben and State of Indiana, have invented a new and useful Trouble-Detector for Spark-Plugs, of which the following is a specification.

This invention relates to a trouble detector for use in connection with the spark plugs of hydro-carbon engines.

It is a well known fact that it is a difficult matter, when an engine is missing fire, to quickly locate the trouble. It is impossible for an expert to tell which plug is not working, without subjecting the plugs to tests.

One of the objects of the present invention is to provide a simple and efficient device which can be attached readily to a hydrocarbon engine and which, when in use, will show accurately whether or not the plug in each cylinder is operating properly.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a view showing, in diagram, the attachment and its connections with a motor. Fig. 2 is a view partly in front elevation and partly in section of the attachment, the same being shown, by full lines, in testing position. Fig. 3 is a section on line A—B Fig. 2. Fig. 4 is a front elevation of a slightly modified form of attachment. Fig. 5 is a rear elevation of the structure shown in Fig. 4.

Referring to the figures by characters of reference 1 designates a circular base having a central boss 2 countersunk in the bottom thereof as at 3. A central opening 4 is formed in the boss and mounted for rotation within this opening is a stem 5. A disk 6 is located within the counterbore 3 and is loosely mounted on stem 5, said disk being held on the stem by a nut 7 which engages the stem. A spring washer 8 is interposed between disk 6 and the inner end of the counterbore 3. A star wheel is screwed onto the stem 5 and is held against the boss 2 by the spring washer 8. A jam nut 10 engages the stem 5 and bears against the star wheel 9. A knob 11 is located at the outer end of the stem 5 and by means thereof the said stem can be rotated readily. An opening 12 is formed in the disk 6 and receives a pin 13 whereby rotation of the disk is limited. The spring washer 8 not only serves to hold the star wheel 9 clamped against the boss 2 but also serves to press the disk 6 outwardly into intimate contact with the nut 7 so that an electrical connection is thus maintained between stem 5 and disk 6. By clamping the star wheel 9 against the boss 2, the said star wheel will be held frictionally into any position to which it may be rotated.

A circular flange 14 extends from the base 1 and secured within this flange is a series of contact points 15, one of these being provided for each cylinder of the engine with which the device is to be used. Each contact has a binding post 16. Flange 14 constitutes a support for a transparent disk 17 and a cap 18 may be used for engaging this disk and for engaging the peripheral portion of the base 1. This cap is preferably provided with a central opening 19 and around this opening are arranged numerals, as shown in Figs. 2 and 3, these numerals representing the cylinders of the engine. Cap 18 is held in place by means of one or more screws 20 extending therethrough and into the base 1. A stop pin 21 extends from the boss 2 and between two of the fingers of the star wheel 9 and constitutes means for limiting the rotation of the star wheel.

In using the device herein described, each of the binding posts 16 is electrically connected to the binding post 22 of a spark plug, the electrical connection 23 from binding post 1 extending to the spark plug of cylinder 1 while the connection 23 of binding post indicated by the numeral 2, extends to the spark plug of cylinder 2. This arrangement is followed throughout the structure. The disk 6 is grounded to the engine, as by means of a wire 24 secured at one end to the disk and at its other end to the engine. In Fig. 1 the engine has been indicated at E, the timer at T, and the source of electrical energy at X. The timer is electrically connected to the spark plug as ordinarily and is also connected in the usual or any preferred manner to the source X and to the engine.

As shown in Fig. 2, the points or contacts 15 are adjusted so that gaps are formed between them and the fingers of the star wheel 9 when said star wheel is moved to active position as indicated by full lines in Fig. 2. This gap is greater than that between the points of the spark plug so that, during the operation of the engine, the spark plugs will operate as ordinarily, the resistance offered by the gaps between the star wheel 9 and the points or contacts 15 being greater than that between the points of the spark plug. Thus it will be seen that, while the spark plugs are properly working, the star wheel 9 can be rotated to the position indicated by full lines in Fig. 2 and no spark will be produced within any of the gaps. If, however, one of the spark plugs should fail to work properly, the current will be shunted to the point or contact 15 connected to said spark plug and will jump the gap to the adjacent finger of the star wheel 9 and this spark will indicate accurately in which cylinder the trouble is located. It is to be understood of course that the star wheel need not be turned to the position shown by full lines in Fig. 2 until trouble arises within the engine. The said star wheel under normal conditions can occupy the position indicated by dotted lines in Fig. 2. As soon as the engine begins to miss fire, however, the star wheel 9 can be rotated by means of the knob 11, this rotation being limited by the pin 21 and as the fingers of the star wheel are thus brought directly opposite the respective points or contacts 15, it can be quickly determined, by observing whether or not sparks jump one or more of the gaps, in which cylinder the trouble is occurring. If no sparks are produced in the attachment under these conditions, it will be apparent that the trouble is not with the spark plug but occurs at some other point within the engine.

The device constituting the present invention can be set up on the dashboard of a motor vehicle where it can be conveniently reached and observed.

Instead of utilizing a star wheel as hereinbefore described, a disk 25 can be secured to the stem 5′, as shown in Fig. 4 and the ground wire 24′ can be secured to a guide 26 secured to the base of the attachment. A disk 12′ can be secured to the back portion of the stem 5′ and a slide 27 of conductive material is mounted in the guide 26 and is adapted to be shifted into and out of engagement with the disk 12′. Under normal conditions the circuit is broken by shifting the slide 27 away from the disk 12′. When, however, it is desired to test the spark plug, it is merely necessary to shift the slide 27 into engagement with the disk 12′ whereupon should one or more of the spark plugs be out of order, sparks will be caused to jump the gap between the disk 25 and those points 15′ connected to the spark plugs which are not working.

What is claimed is:—

1. A trouble detector for spark plugs including a central member of conductive material, points arranged about said member and spaced therefrom, means for electrically connecting the points to the respective spark plugs, said central member being adapted to be grounded to the engine, the gap between the said central member and the points being greater than that between the points of the spark plugs.

2. An attachment for spark plugs of hydrocarbon engines, including a central member of conductive material, spaced points arranged therearound and spaced therefrom, there being normally gaps between the points and central member slightly greater than the gap between the points of the spark plugs, means for electrically connecting the respective points of the attachment to the corresponding spark plugs, means for grounding the central member to the engine, and means adjacent the points of the attachment for indicating the plugs to which the points are connected.

3. An attachment for spark plugs of hydrocarbon engines, including a central member of conductive material, spaced points arranged therearound and spaced therefrom, there being normally gaps between the points and central member slightly greater than the gap between the points of the spark plugs, means for electrically connecting the respective points of the attachment to the corresponding spark plugs, means for grounding the central member to the engine, and means for placing the central member in and out of active coöperation with the points.

4. A trouble detector for the spark plugs of explosive engines, including a central revoluble member, points arranged therearound and adapted to be electrically connected to the respective spark plugs, means for grounding the central member to the engine, and means for limiting the rotation of the central member, said member being movable into and out of position to make and break a spark gap between the member and the respective points.

In testimony that I claim the foregoing as my own, I have hereto affixed my signature in the presence of two witnesses.

GEORGE M. BEARD.

Witnesses:
LOUIS E. SCHAFFER,
ANTRIS BEARD.